United States Patent [19]

Van Davelaar

[11] Patent Number: 4,603,270

[45] Date of Patent: Jul. 29, 1986

[54] PARTICLE FREE LINEAR MOTOR

[75] Inventor: Peter C. Van Davelaar, Santa Clara, Calif.

[73] Assignee: Ampex Corporation, Redwood City, Calif.

[21] Appl. No.: 614,354

[22] Filed: May 25, 1984

[51] Int. Cl.⁴ ............................................. H02K 41/00
[52] U.S. Cl. ................................................ 310/13; 310/27
[58] Field of Search ................................... 310/13, 27

[56] References Cited

U.S. PATENT DOCUMENTS 3,417,269  12/1968  Heller ........................................ 310/27
4,439,699   3/1984  Brende et al. ............................. 310/13

FOREIGN PATENT DOCUMENTS 885024  12/1961  United Kingdom ................. 310/27

Primary Examiner—Donovan F. Duggan
Attorney, Agent, or Firm—Harry G. Thibault; Joel D. Talcott

[57] ABSTRACT

An arrangement for a linear motor which uses a shorted turn as a shield for the magnet of the motor to thus provide a substantial reduction in the introduction of particulate matter into the Head Disk Assembly environment associated with the linear motor, without substantially increasing the reluctance of the magnetic circuit of the motor.

7 Claims, 3 Drawing Figures

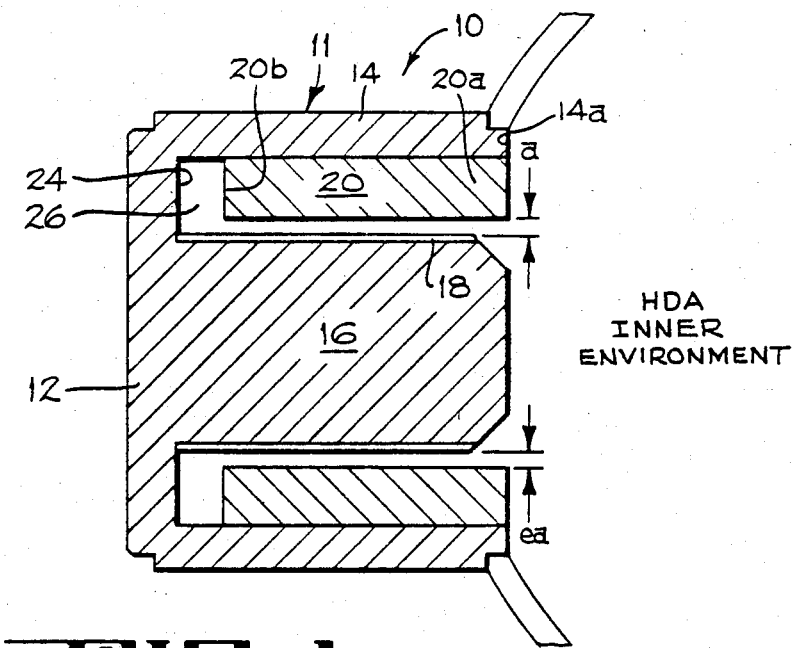
FIG_1 PRIOR ART
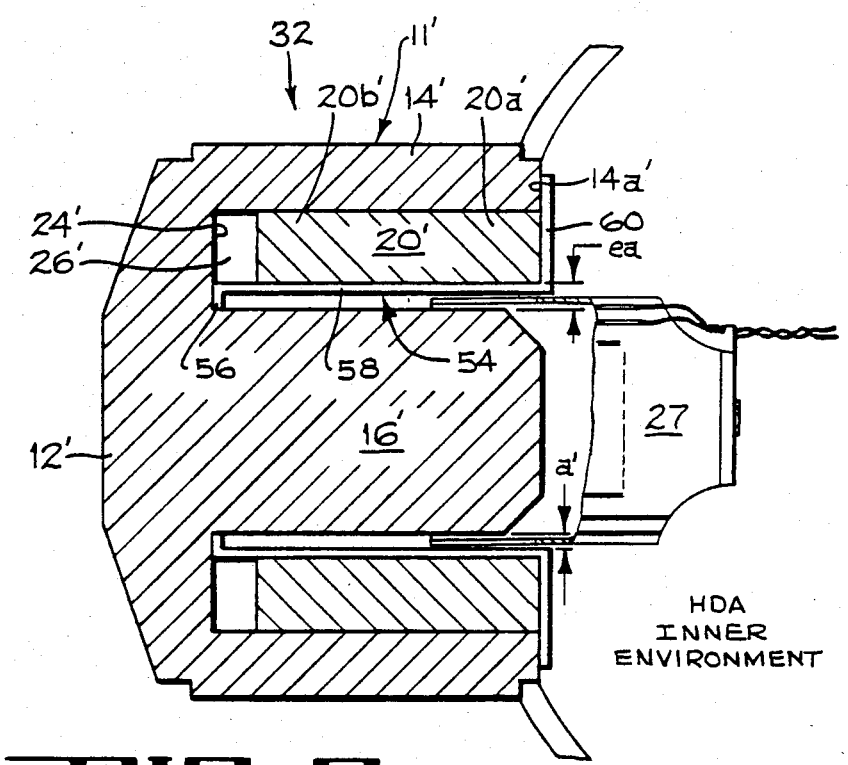
FIG_3

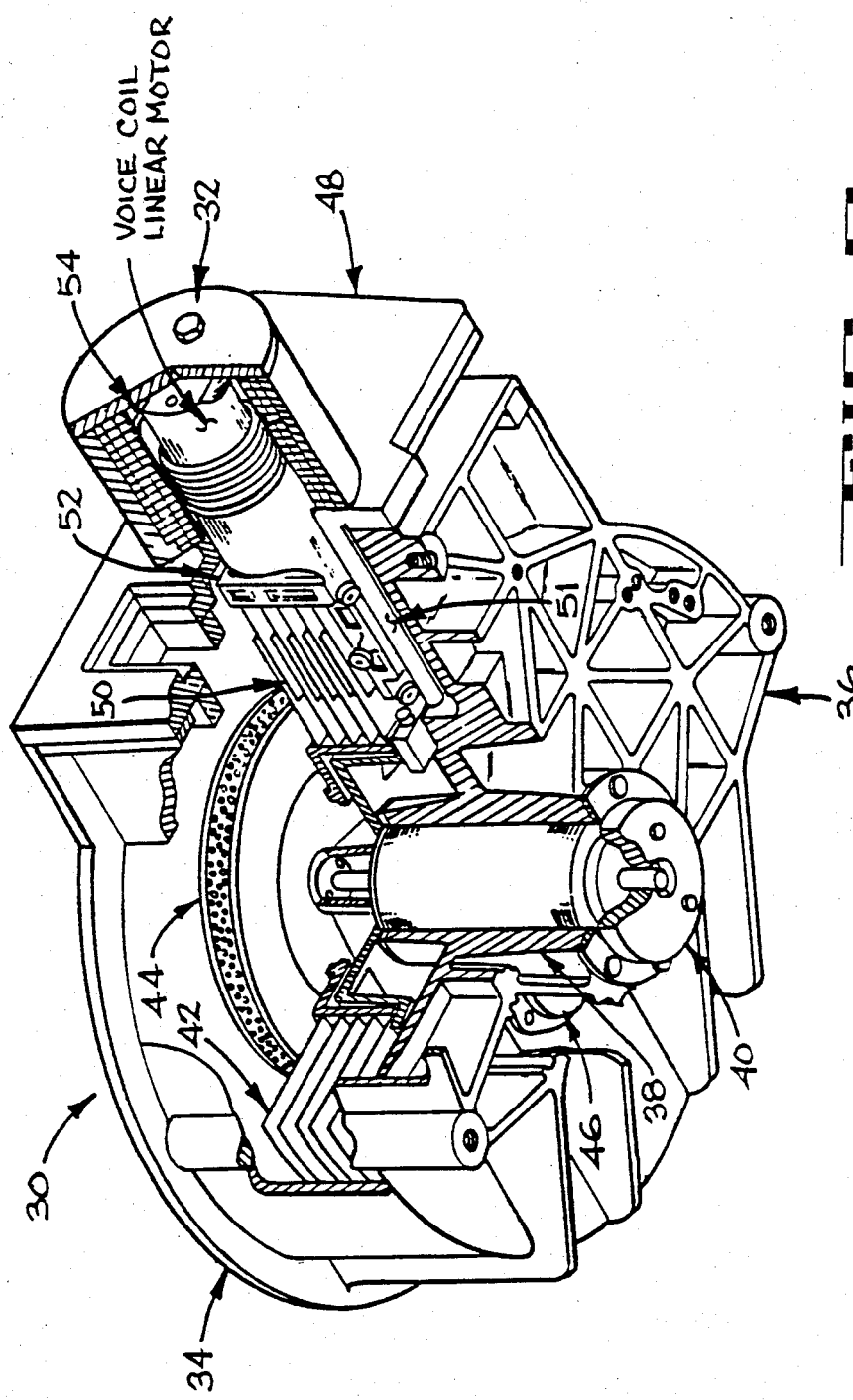
FIG._2

PARTICLE FREE LINEAR MOTOR

The present invention relates to linear motors and more particularly to an arrangement for a linear motor provided in a Head Disk Assembly of a disk drive which makes a substantial contribution to the maintenance of a particle free environment within the Head Disk Assembly.

In a disk drive constructed in accordance with the teachings of the prior art, the Head Disk Assembly includes a linear motor which comprises a cylindrical housing of magnetically conductive material which includes a base, a peripheral outer wall and a center pole. Fixed to the center pole is a shorted turn. Mounted adjacent to the inner surface of the outer wall is a magnet separated at its inner surface from the center pole by an air gap of uniform dimension which receives an electrical coil for reciprocation.

Typically, the inner end of the magnet mounted adjacent the outer wall of the housing terminates short of the base of the housing resulting in a cavity therebetween. Because of manufacturing tolerances a separation between the base of the housing and the inner end of the magnet cannot be avoided. Therefore, the outer end of the magnet is normally aligned to be flush with the outer end of the peripheral wall of the housing.

The cavity is an area that may contain dust and stray magnetic particles that were generated during the assembly process. Further, the cavity between the base and the magnet is difficult to clean and difficult to inspect for cleanliness. Finally, because the magnet section is directly exposed to the Head Disk Assembly environment, debris will readily transfer further into the Head Disk Assembly environment where such particles can cause severe degradation of drive performance.

One current solution includes coating the magnet with a polyurethane enamel to seal all particles against the magnet. This process is difficult to control and the coating occasionally blisters and actually contributes to the particle problem. Further the finished product is difficult to inspect. A proposed solution, installing a separate shield to isolate the magnet would increase the effective air gap, since the actual air gap must remain constant to accept the coil, and significantly increase the reluctance of the magnetic circuit of the motor.

The arrangement for a linear motor, as proposed by the present invention, would eliminate the exposure of the cavity between the magnet and the base of the housing to the Head Disk Assembly environment and eliminate the need for coating the magnet by sealing the magnet out of the head disk area. Further such arrangement would not require a separate shield for the magnet which shield would increase the effective air gap and significantly increase the reluctance of the magnetic circuit of the motor.

In accordance with the present invention, a particular arrangement for a linear motor includes a housing of magnetically conductive material having a base and a center pole mounted on the base. Extending upwardly from the base is a peripheral outer wall of the housing which is concentric with the center pole. Mounted to an inner surface of the outer wall of the housing is a cylindrical magnet comprised of magnetic arc segments and separated at its inner surface from the center pole by an air gap of uniform thickness between its inner surface and the center pole, said air gap receiving an electric coil for reciprocation on an axis coincident with the axis of the center pole.

The cylindrical magnet is so disposed adjacent the outer wall of the housing as to result in a cavity between an inner end of the base of the housing and the inner end of the cylindrical magnet. A shorted turn is also mounted between the center pole and the cylindrical magnet. The linear motor of the present invention utilizes the shorted turn as a shield for the magnetic arc segments by positioning it at the inside diameter of the magnet section instead of at the outside diameter of the center pole, and extending it to the base and the outer wall of the housing to completely shield the magnet section from the Head Disk Assembly environment. Thus, in the present invention, the shorted turn is so disposed between the center pole and the cylindrical magnet section as to close the cavity between the housing and the magnet, and seal the magnet out of the Head Disk Assembly inner environment, while maintaining the air gap for receiving the electrical coil for reciprocal movement on an axis coincident with the center pole.

Other advantages of the present invention will become apparent upon a consideration of a detailed description of the invention as set forth below particularly when considered in combination with the drawings provided.

BRIEF DESCRIPTION OF THE DRAWINGS

FIG. 1 is a drawing of the prior art arrangement for a linear motor employing a shorted turn fixed to the outside diameter of a center pole for the linear motor;

FIG. 2 is a perspective drawing of a Head Disk Assembly which employs a linear motor arrangement as taught by the present invention; and FIG. 3 is a linear motor wherein the shorted turn is shown in an arrangement taught by the present invention.

In FIG. 1 a prior art arrangement for a linear motor incorporating a shorted turn is shown. The linear motor 10 comprises a housing 11 having a base 12 and a peripheral outer wall 14 extending upwardly from the base 12. A center pole 16 is mounted on the base 12 and a shorted turn 18 is fixed to the O.D. of the center pole 16. The base 12, the outer wall 14 and the center pole 16 are comprised of magnetically conductive material, such as 1018 steel. Linear motor 10 further comprises a cylindrical magnet 20 concentric with and mounted adjacent to the inside of the outer wall 14. Due to manufacturing tolerances an outer end face 20a of the magnet 20 is aligned so as to be coextensive with an outer end face 14a of the wall 14, with an inner end face 20b of the magnet 20 terminating short of an inner end face 24 of the base 12 to thus result in a cavity 26 therebetween. The cavity 26 is very hard to clean and to inspect for cleanliness.

An air gap a of uniform thickness is provided between an inner surface of the magnet 20 and the shorted turn 18 fixed to the center pole 16, said air gap a receiving an electric coil 27 as shown in FIG. 3 for reciprocation on an axis coincident with the axis of the center pole 16. The air gap a between the magnet 20 and the shorted turn 18 must be held to the minimum possible for a given coil size and tolerances to maintain a low reluctance in the magnetic path.

The magnetic assembly 10 was part of a linear motor used in the Head Disk Assembly of a disk drive. When the magnet 20 was directly exposed to the Head Disk Assembly environment, debris would readily migrate from the magnet assembly 10 to areas of the disk drive where it may cause severe damage.

Accordingly a new combination comprising a Head Disk Assembly 30 and a linear motor 32 was devised. As shown in FIG. 2 the Head Disk Assembly 30 comprises a cover 34, a base plate 36, a spindle 38 rotatably mounted on the base plate 36, and a drive system 40 operatively connected to the spindle 38. Mounted on the spindle 38 are a series of disks 42 for data recording, storage and reproduction. In the depicted embodiment of FIG. 2, five 14 inch disks 42 are mounted on the spindle 38. Also associated with the Head Disk Assembly 30 is a recirculating filter 44 and a breather filter 46.

The linear motor 32 is mounted on an end plate 48 of the Head Disk Assembly 30. The coil 27 carries at its outer end a head assembly 50 comprised of multiple read and record heads and a servo head for positioning the assembly 50 which engages a guide rail 51 provided in the interior of the Head Disk Assembly 30. The coil 27 and head assembly 50 comprise a carriage 52 mounted for reciprocation on an axis coincident with the axis of the center pole 16' of the linear motor 32.

The linear motor 32, as shown in FIG. 3 displays an arrangement embodying the present invention. All of the elements of FIG. 3 which are structurally similar to the elements of FIG. 1 will be identified with the same reference numerals followed by a prime ('). New elements will be identified by additional new reference numbers.

In FIG. 3 the linear motor 32 comprises a housing 11' having a base 12', a peripheral side wall 14' mounted on the base 12' and a center pole 16' mounted on the base 12'. A magnet 20' is mounted adjacent an inner surface of side wall 14' of the linear motor 32. Due to manufacturing tolerances an outer end face 20a' of magnet 20' is aligned to be coterminous with an outer end face 14a' of the side wall 14'. An inner end face 20b' of magnet 20' terminates short of an inner end face 24' of the base 12' resulting in a cavity 26' therebetween.

A shorted turn 54 has a lower flange 56 which abuts the inner end face 24' of the base 12', a side portion 58 which engages an inner face of the magnet 20' and a flange 60 which extends across the coterminal end faces 14a' and 20a' of the side wall 14' and the magnet 20'. The shorted turn 54 so arranged, seals the cavity 26' as well as the magnet 20' from the inner area of the Head Disk Assembly and provides an effective air gap ea' between the center pole 16' and the magnet 20' which is only slightly increased from the effective air gap of FIG. 1, due to a thicker sheet of copper being used for shorted turn 54 to maintain the same electrical resistance in the shorted turn 54.

An air gap a' of uniform thickness is provided between an inner surface of the shorted turn 54 and the center pole 16', said air gap a' receiving the electric coil 27 for reciprocation on an axis coincident with the axis of the center pole 16'.

Thus a significantly cleaner motor is produced with only a slight increase in the effective air gap due to a thicker shorted turn. However the resulting increased reluctance of the effective air gap is countered by the removal of copper from the center pole. This permits 100% of the space reserved for the center pole to be used as a flux path. Thus the proposed arrangement seals the cavity 26' making the linear motor 32 easier to clean and inspect. The need for coating the magnet 20' is eliminated. The shorted turn 54 can now act as an additional heat path for dissipating heat produced by the coil 27. Finally, a potential problem of corrosion between the shorted turn 54 and the steel center pole 16' is eliminated.

Although the present invention has been described in a particular embodiment thereof, and in a Head Disk Assembly environment, it will be appreciated that the invention need not be limited to such environment and that changes and modifications can be made in the elements described without effecting the definition of the invention as set forth in the appended claims.

What is claimed is:

1. A linear motor including a housing having a base, a center pole mounted on the base, a magnet so mounted on the housing as to produce a cavity between an inner end of the base of the housing and an inner end of the magnet, the manget so disposed on the housing as to provide an air gap of uniform thickness between an inner surface of the magnet and the center pole, said air gap receiving an electric coil for reciprocation on and axis coincident with the center pole, and a shorted turn mounted between the magnet and the center pole having a lower end engaging the inner end of the base of the housing, and an upper end engaging and upper end of the housing, so as to seal the cavity and the magnet betwen the housing and the shorted turn while maintaining the air gap.

2. A linear motor as claimed in claim 1 wherein the housing comprises an outer wall extending from the base and outward of the center pole and the magnet is mounted on an inner surface of the outer wall.

3. A linear motor as claimed in claim 2 wherein the housing is cylindrical, the outer wall is a peripheral wall of the housing, and the magnet is cylindrical, divided into a series of arc segments mounted on the outer wall.

4. A linear motor as claimed in claim 2 wherein an outer face of the magnet is aligned with an outer face of the outer wall so as to result in the cavity between an inner face of the magnet and inner face of the base of the housing.

5. A linear motor as claimed in claim 1 wherein the shorted turn comprises a cylindrical member having a main body portion, a flange portion at one end thereof, and opposite end of the main body portion abutting an inner face of the base of the housing, the main body portion overlying the cavity and the magnet, and the flange portion overlying and outer face of the magnet and an outer face of the housing.

6. A linear motor as claimed in claim 5 wherein the inner end of the shorted turn terminates in and annular footed portion which abuts an inner face of the base of the housing.

7. A Head Disk Assembly which comprises a cover, a base plate, a spindle rotatably mounted on the base plate, a drive system operatively connected to the spindle and a series of disks mounted on the spindle, a linear motor being mounted on an end plate of the Head Disk Assembly and including a housing having a base, a center pole mounted on the base, a magnet so mounted on the housing as to produce a cavity between an inner end of the base of the housing and an inner end of the magnet; the magnet so disposed on the housing as to provide an air gap of uniform thickness between and inner surface of the magnet and the center pole, said air gap receiving and electric coil of a head carriage of the Head Disk Assembly for reciprocation on an axis coincident with the center pole, and a shorted turn mounted betwen the magnetic and the center pole, having a lower end engaging the inner end of the base of the housing, and an upper end engaging and upper end of the housing, so as to seal the cavity and the magnet between the housing and the shorted turn and out of the inner Head Disk Assembly environment while maintaining the air gap.

* * * * *